Sept. 22, 1936.   C. J. LEMONT   2,054,940
DROP-ON CONNECTER
Filed Aug. 25, 1934
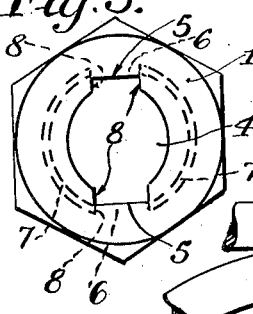
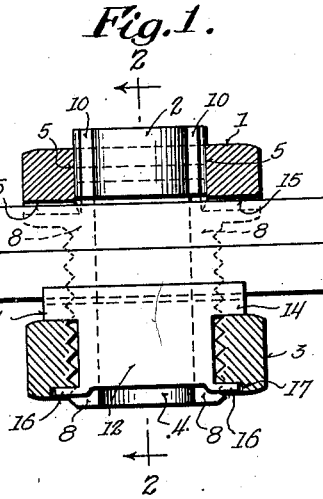
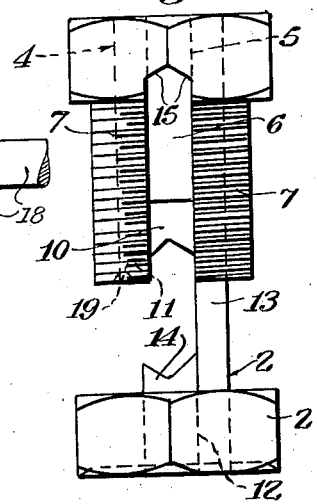
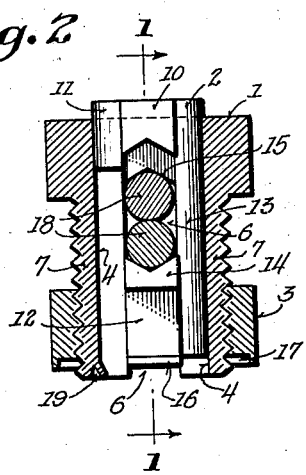
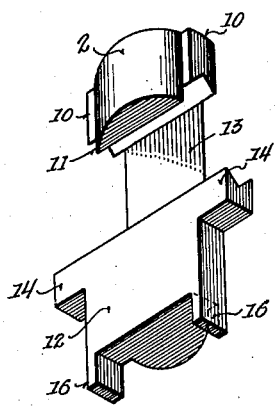
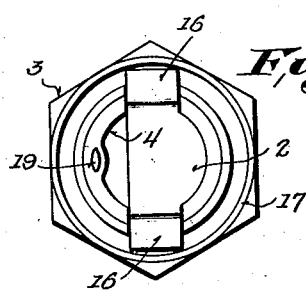
Clarence J. Lemont
INVENTOR
BY
ATTORNEY Patented Sept. 22, 1936

2,054,940

UNITED STATES PATENT OFFICE 2,054,940

DROP-ON CONNECTER

Clarence J. Lemont, South Milwaukee, Wis., assignor to Line Material Company, South Milwaukee, Wis., a corporation of Delaware Application August 25, 1934, Serial No. 741,368

4 Claims. (Cl. 173—263)

This invention relates to improvements in connecters. The disclosure in this application relates generically to the same subject matter as that disclosed in the application of William D. Kyle and Clarence J. Lemont, Serial No. 701,764, filed December 11, 1933, for Connecters.

It is an object of this invention to provide for electrical conductors a connecter comprising a threaded bifurcated sleeve, a nut engageable with the threaded sleeve, and a plunger slidable in the sleeve to support the nut when disengaged from the sleeve, the bifurcations serving to keep the plunger and sleeve in non-rotative relationship.

Another object is to provide concealed means for securing the plunger and nut rotatively but non-axially movable relative to each other whereby the operator of the connecter will be protected against contact with sharp corners or ragged edges.

In the drawing

Fig. 1 is a sectional view taken on the line 1—1 of Fig. 2.

Fig. 2 is a sectional view taken on the line 2—2 of Fig. 1.

Fig. 3 is a view in perspective showing the nut supporting member before it is assembled in the connecter structure.

Fig. 4 is a plane view of the lower end of the device shown in Figs. 1 and 2.

Fig. 5 is a top plan view of the clamping sleeve.

Fig. 6 is a side elevation of the connecter in extended position and viewed from the same position as Fig. 2.

Like parts are identified by the same reference characters throughout the several views.

The connecter comprises a bifurcated-threaded sleeve 1, a nut support 2 reciprocal in the sleeve and a nut 3 engaging the sleeve and rotatively secured to the support 2. The bifurcated sleeve 1 is provided with a bore 4 having oppositely disposed slots 5 parallel with the axis of the bore and registering with the spaces 6 between the bifurcations 7 of the sleeve to form continuations of the guiding surfaces 8 of the bifurcations.

The nut support 2 is reciprocal in the bore 4 and is provided with a plunger portion 10 projecting into the slots 5 and having the stop portion 11 on one side of the plunger and a portion 3 on the other side thereof extending along the bore of the bifurcated sleeve and connected with the nut retaining portion 12 of the support.

The retainer portion 12 is spaced from the plunger portion 10 and is provided with a V shaped jaw 14 extending over the nut to co-act with the similar jaws 15 on the sleeve 1. The retainer portion 12 is also provided with lugs or tongues 16 extending beneath the nut 3 to hold the nut on the retainer.

Fig. 3 illustrates the nut support as it appears before it is assembled in the connecter. When the nut 3 has been mounted on the retainer 12, the tongues 16 are bent laterally as illustrated in Figs. 1 to 3, inclusive, and are positioned within the arcuate groove 17 in the lower face of the nut. Thus, the tongues 16 are positioned so that their edges or corners will not catch the hand or glove worn by the manipulator of the connecter.

As will be observed, the retainer portion 12 extends across the bore and into the spaces between the bifurcations of the sleeve, thereby preventing the sleeve from collapsing inwardly when the conductors 18 are gripped between the jaws 14 and 15. After the plunger portion 10 has been inserted into the bore 4 from the bifurcated end, a tool mark 19 is made in the end of the bifurcation opposite the arcuate section 13 or nut support 2, thereby deforming the end of the bore 4 and preventing withdrawal of the plunger portion 10.

From the foregoing it will be observed that the plunger portion 10 of the nut support serves to prevent rotation of the nut support relative to the bifurcated sleeve, portion 10 sliding at its ends between the bifurcations when the nut support is extended from the sleeve. It also becomes apparent that the portion 11 of the nut support serves as a stop to limit the outward movement of the nut support relative to the bifurcated sleeve when it engages the deformed portion 19 of the sleeve.

From the foregoing description it becomes apparent that I have improved the structure of the device disclosed in the Kyle and Lemont application previously noted, and thereby improved the method of assembling the connecters as well as reduced the cost of manufacturing the connecter parts to a minimum.

It also is apparent that I have improved the method of mounting the clamping nut upon its supporting element so that there are no projecting parts below the nut that will interfere with the operations of clamping the connecter to a conductor. All parts of the supporting element that have heretofore projected below the plane of the lower face of the nut, are now concealed above that plane and within the structure of the nut itself.

It will also be apparent from the foregoing disclosure that I have simplified the connecter arrangement by reason of the fact that I have utilized the adjacent surfaces 8 of the bifurcated ends as guiding means to prevent rotation of the nut supporting means relative to the bifurcated element when the nut is supported in spaced relation to the bifurcated element.

I claim:

1. A connecter comprising a bifurcated-threaded sleeve having a bore extending from end to end, said bore having diametrically opposite slots registering with the space between the bifurcations of said sleeve; a nut support reciprocally mounted in said sleeve and comprising a plunger portion movable in said slots, a stop portion movable in the bore, and a nut retainer portion in spaced relation to the plunger portion and connected therewith; and a nut rotatively carried by said retainer, said sleeve being provided with means disposed in the path of said stop portion, whereby to support the nut in spaced relation to the sleeve.

2. A connecter comprising a bifurcated-threaded sleeve in combination with a clamping nut threadable on said sleeve, and a nut support reciprocal in said sleeve and comprising a plunger portion and a nut retaining portion rotatively supporting said nut, said sleeve having a bore extending from end to end complementary to said plunger, the end of one of said bifurcations having a tool mark extending thereinto to deform the end for engagement with the plunger when the nut is disengaged from the bifurcated sleeve.

3. A connecter comprising a bifurcated threaded sleeve in combination with a clamping nut threadable on said sleeve, and a nut support reciprocal in said sleeve, said support comprising a plunger portion and a nut retaining portion spaced from the plunger portion and rotatively supporting said nut, said sleeve having a bore extending from the bifurcated threaded end and complementary to the plunger, the end of one of said bifurcations having a stop comprising an integral portion of said bifurcation bent inwardly of said bore for engagement with the plunger, said nut being supported by the retainer portion in spaced relation to the bifurcated end of the sleeve when the plunger engages said stop.

4. A connecter comprising a threaded bifurcated sleeve, a nut support, a clamping nut carried by the support and engageable with the threads on said sleeve, and means in the sleeve engageable with said support to prevent separation of said sleeve and support; said support comprising a plunger portion slidable in said sleeve and engageable by said means to be retained within the sleeve and a nut retainer portion connected with and spaced from the plunger portion to be supported thereby in a position exteriorly of the sleeve, said nut being rotatively mounted on said retainer and having in the face most remote from the plunger portion an annular groove substantially concentric with its axis of rotation, and lugs on said retainer extending radially of said nut and disposed in said groove.

CLARENCE J. LEMONT.